W. K. FOSTER.
Tire-Tightener.
No. 69,557.　　　　　　　　　　　　　　　　　Patented Oct. 8, 1867.
Fig. 1.
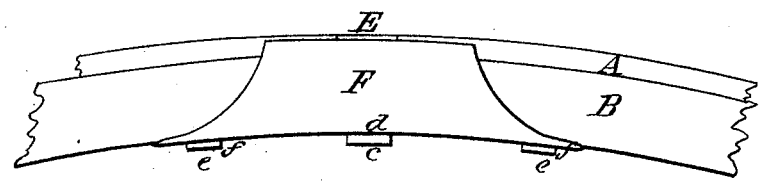
Fig. 2.
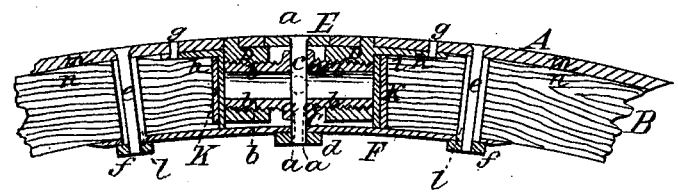
Fig. 5.
Fig. 3.　　　　Fig. 6.　　　　Fig. 4.
　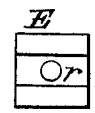
Fig. 7.
Witnesses:
J. P. Hale Jr.
George Andrews
Inventor:
Walter K. Foster
by his Attorney
R. H. Eddy
AM. PHOTO-LITHO. CO. N.Y. (OSBORNE'S PROCESS.)

United States Patent Office.

WALTER K. FOSTER, OF BANGOR, MAINE.

*Letters Patent No. 69,557, dated October 8, 1867.*

IMPROVEMENT IN CARRIAGE-WHEELS.

The Schedule referred to in these Letters Patent and making part of the same.

TO ALL PERSONS TO WHOM THESE PRESENTS SHALL COME:

Be it known that I, WALTER K. FOSTER, of Bangor, in the county of Penobscot, and State of Maine, have made a new and useful invention having reference to Carriage-Wheels, and particularly to an improvement patented by me on the 22d day of November, A. D. 1864; and I do hereby declare the same to be fully described in the following specification, and represented in the accompanying drawings, of which—

Figure 1 is a side view of a wheel-felloe and tire, and their contractile mechanism, as provided with my invention.

Figure 2 is a longitudinal section, and

Figure 3 a transverse section of them.

Figure 4 is an end view of one of the straining-nuts, to be hereinafter described.

In such drawings, A A denote the tire, and B B the felloe of a wheel; C is a round head or cylinder, perforated radially with a series of holes, $a\ a\ a$, and having two male screws $b\ b$ projecting in opposite directions from it. One of these screws is what is termed a "right" and the other a "left" threaded screw. They enter nuts D D, fastened to the felloe at its two ends. A block of metal, E, is placed in the space between the two extremities of the tire. This block, previous to any contraction of the tire to make it fit closely to the felloe, is to be filed away, in order to enable such contraction to take place. A screw-bolt, $c$, goes down through such block and the head C, and also through a metallic shoe, F, which is formed and arranged on the felloe, and with respect to the tire, as represented in the drawings. A nut, $d$, is screwed on the said bolt and against the shoe, and serves with the bolt to aid in keeping the shoe in place on the felloe. Other screw-bolts, $e\ e$, go down through the tire and mortises in the felloe, and also through slots $l\ l$ made in the shoe, after which they receive nuts $f\ f$ upon them, and serve with such nuts to aid in fixing the shoe to the felloe, as well as to confine the tire to the latter. The tire is connected with the two nuts D D by means of round projections $g'\ g'$ from the latter. These projections go through the tire, and are upset thereon. There is an arm or brace, $h$, extended from each nut, and serving as a support to the tire. The lower side of this brace is recessed in manner as shown at $i$, such recess being to receive the felloe and prevent the tire from moving laterally with reference to the felloe. The recess also enables the screw to be brought closer up to the tire than it otherwise could be. Between each end of the felloe and the end of the male screw next adjacent to such end of the felloe, I place one or more thin plates $k$ of metal, the same being to fill the space between the screw and the said end of the felloe. In case the felloe should become too much expanded at any time, the said plate or plates may be removed so as to ease it.

From the above it will be seen that the two ends of the felloe practically abut against the ends of the right and left screws, or against two of the plates $k$, supported by such screws. Thus the screws serve to prevent any movement of the two ends of the felloe toward each other while such screws are being revolved for the purpose of contracting the tire upon the felloe. The shoe covers the contractile mechanism, and aids in keeping it in its due relation or position with respect to the felloe. The tire I construct with its inner surface concave transversely, as shown at $m$, to fit the felloe, made correspondingly convex, as shown at $n$. (See Figure 8, which is a transverse section of the felloe and tire.) This construction of the tire and felloe operates to prevent lateral displacement of the two while the wheel may be in use. The tire is not a continuous hoop or whole circle. The same may be said with respect to the felloe. By removing the bolt from the head of the contractile screws, and revolving such head in the right direction, we can contract the tire. It is well known that a carriage-wheel tire, while in use, is liable to become stretched or expanded, in which case, to cause it to fit to the circumference of the felloe, it has to be removed therefrom, and cut apart, and contracted and welded together, and reset upon the wheel.

The contractile mechanism above mentioned suffices to effect the proper reduction of the tire without requiring its removal from the felloe, and besides this the male screws, (and their head) of such contractile mechanism, are in continuation of and serve to form part, as it were, of the felloe, or, in other words, to give support to it at its extremity, in manner as hereinbefore explained.

I form the under side of the block E with a three-sided recess, $r$, (see Figures 5 and 6,) one of which is an end view, and the other a bottom view, of the block E. The two nuts where the block rests on them are correspondingly shaped, in reverse, the same being as shown in section in Figure 7. This, while the wheel is in use, prevents the block from lateral movement tending to strain or bend the lips of the shoe.

I do not herein claim the contractile mechanism as composed of the right and left screws, their common heads and nuts applied to the two. Nor do I herein claim the subject of my patent as hereinbefore mentioned.

What I claim as my present invention or improvements, is as follows:

I claim the arrangement of the ends of the felloe, substantially as above described, viz, so as to be supported by the ends of the male contracting screws or by plates of metal, separate from the nuts, and placed between the two, and sustained by such screws.

I also claim the formation of the braces $h$ of the nuts, with recesses $i\ i$, in their inner sides, such being as and for the purpose set forth.

I also claim the tire, as made with its inner surface concave transversely to fit to a corresponding convexity of the felloe, as set forth.

I also claim the formation of the block E with the peculiar recess $r$, or its equivalent, in combination with the formation of the nuts with counterparts to enter such recess, as set forth.

I also claim the combination of the braces $h\ h$ with the tire A, the nuts D D, and the right and left screw thereof, arranged substantially in manner and so as to operate as set forth.

W. K. FOSTER.

Witnesses:
R. H. EDDY,
F. P. HALE, Jr.